Sept. 15, 1936.  J. L. STEINBACH  2,054,304
HYDRAULIC CHEESE PRESS
Filed April 1, 1935   2 Sheets-Sheet 1
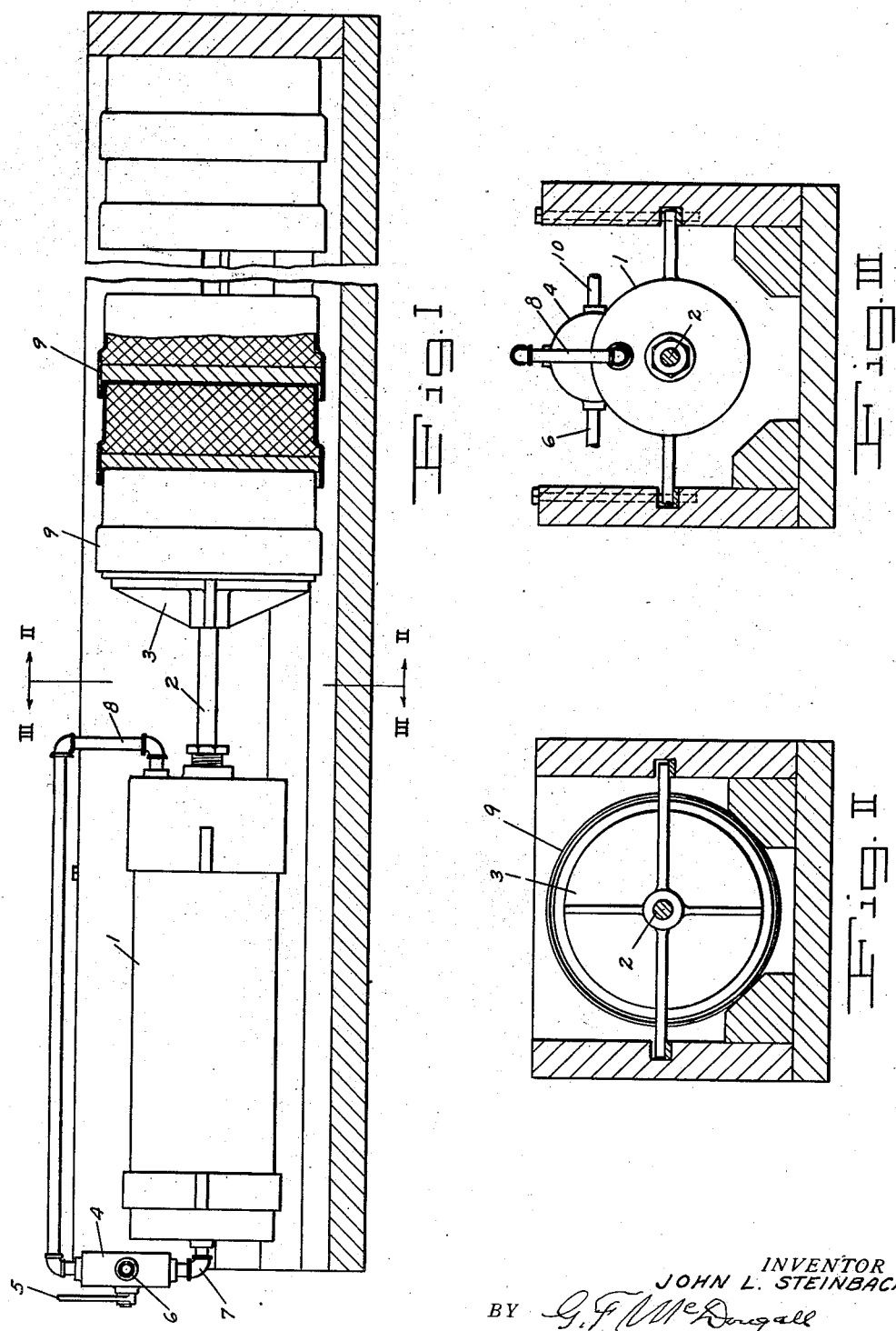
INVENTOR
JOHN L. STEINBACH
BY G. F. McDougall
ATTORNEY

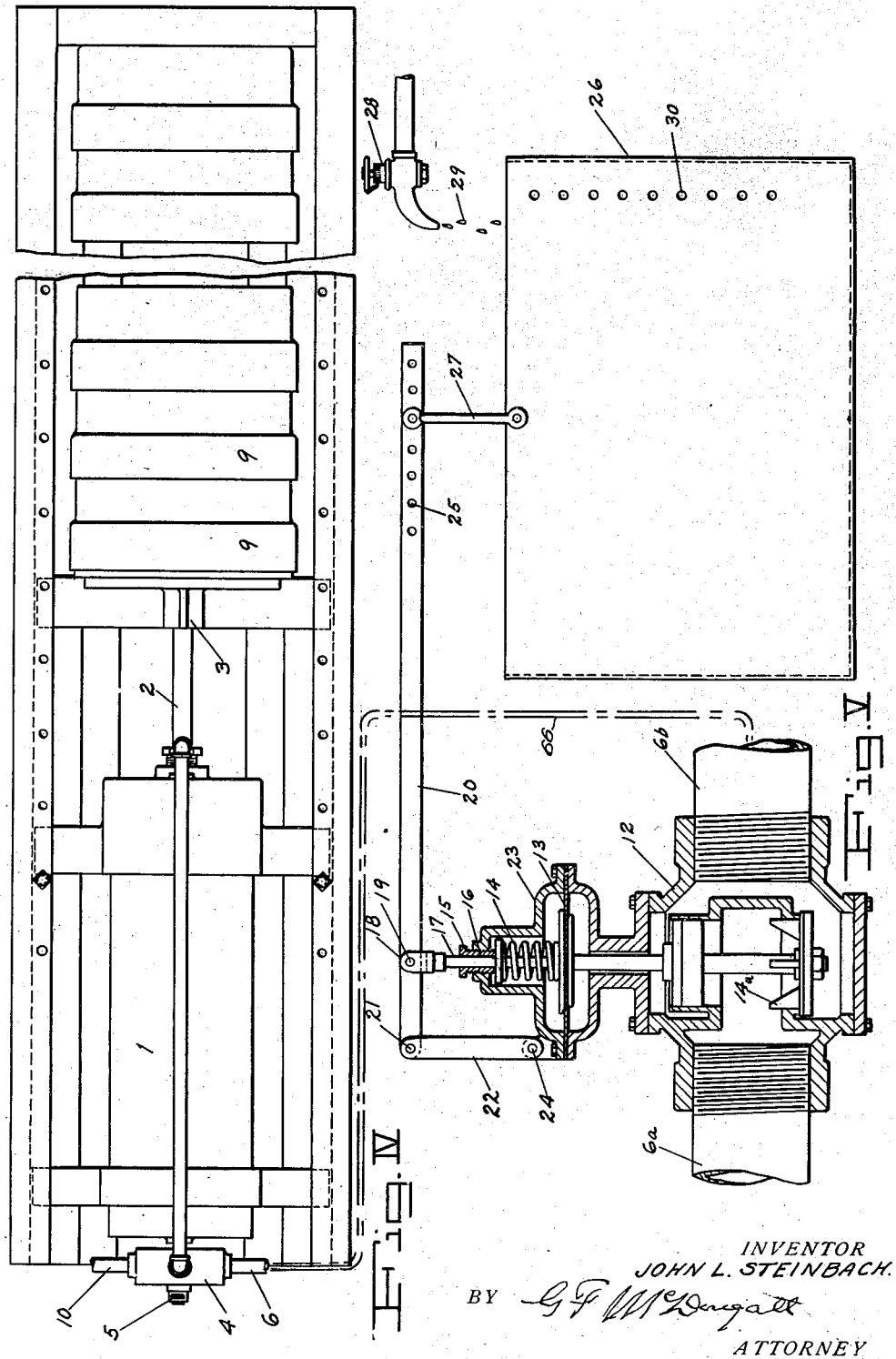

Patented Sept. 15, 1936

2,054,304

UNITED STATES PATENT OFFICE 2,054,304

HYDRAULIC CHEESE PRESS

John L. Steinbach, Tillamook, Oreg.

Application April 1, 1935, Serial No. 14,019

6 Claims. (Cl. 121—38)

My invention relates to the well-known cheese press and has for its principal object a device for utilizing hydraulic pressure instead of the customary screw or ratchet device, and in connection therewith includes means for gradually and progressively increasing the pressure and means for determining a high pressure limit.

The above and other objects will be immediately apparent to those skilled in the art to which this invention appertains and may be particularly ascertained by the claims.

The following drawings accompany and form a part of this specification, in which,—

Fig. I is a diagrammatic representation of a cheese press equipped with hydraulic power applying means;

Fig. II is a section on line II—II of Fig. I;

Fig. III is a section on the line III—III of Fig. I; being a view in the opposite direction from the view shown by Fig. II;

Fig. IV is a plan view of the press as shown in Fig. I; and

Fig. V is an enlarged view of my new control device.

One of the principal purposes of applying pressure to cheese curds to form the curds into cheeses is to force out surplus moisture, which adds to the keeping and other desirable qualities of the cheese.

It is also necessary to get best results that this pressure be applied gradually starting at a comparatively low pressure such as 15 pounds per square inch of area of a cheese case and very gradually increasing that pressure over a period of hours up to as much as say 50 pounds per square inch or more dependent on the quality of the curds and also upon the desired moisture content of the finished cheese.

In the drawings, I is a hydraulic cylinder containing a reciprocating piston therein which is not shown and which is operatively connected to the piston rod 2, and power is applied by the piston rod 2 to the press head 3 in the well known manner.

A four way valve 4 operable by a handle 5 is provided so that water pressure may be delivered by the inlet pipe 6 and directed to either end of the hydraulic cylinder I, by means of the pipe 7 or 8, the first named being used to apply pressure to the cheese cases 9, and the second named being for the purpose of reversing the pressure in the cylinder I to withdraw the head when removing the contents of the press for recharging.

10 is a discharge or waste pipe which will lead to any convenient place for disposition of the waste water used by the hydraulic cylinder I.

Interposed in the supply pipe 6 will be a pressure reducing valve 12, a typical diagrammatic sketch of which is shown in Fig. V, which shows a valve of the diaphragm type having a diaphragm 13 and a double beat valve 14 that is controlled by the diaphragm and in this valve the pipe 6 will be presumed to be connected to a source of hydraulic pressure at least equal to the maximum pressure required.

The center lines 66 diagrammatically indicate how the reducing valve of Fig. V is attached to the four-way valve 4, Fig. IV, to deliver reduced pressure thereto.

The pipe 6 will be continued to connect to the press at valve 4. The diaphragm 13 will be loaded by the spring 14 adjustable by the adjusting screw 15. A fixed setting of this screw 15 may be for the initial pressure required. The screw 15 is shown to have an internal bore 16 through which is slidably mounted a pressure rod 17 connected to an eye 18, provided with a pivot 19, whereby it may receive force from a lever 20.

The lever 20 is pivoted at 21 to a link 22, in turn pivoted to the diaphragm casing 23 by the pivot 24. The lever will preferably be supplied with a plurality of holes near its free end, such as 25. Suitable means for suspending a container, such as 26, is shown by the clevis 27. A metering valve 28 will be connected to a convenient water supply and so regulated that a drop by drop quantity of water such as shown at 29 will flow into the container 26 increasing its weight, and by reason of the lever 20 and the connection thereof indirectly to increase the load on the diaphragm 13, it supplements the force of the spring 14, to adjust the reducing valve 14a to deliver a gradually increasing pressure to the hydraulic cylinder I.

The container 26 may be provided with a series of openings such as 30 and any convenient means such as separate plugs may be employed to close one or several of the lower openings such as 30 to increase the quantity that the container 26 will hold before reaching an overflow point. This or any other convenient means may be used to limit the ultimate capacity of the container.

Obviously a container of predetermined weight when full of water, and without any means for changing the normal water level, may be substituted for one having means within itself to regulate its ultimate contents.

The metering valve 28 may be so adjusted to add a definite quantity of water to the container 26 in a definite time and if the pressure is intended to increase over a period of six or seven hours or eight hours or any other length of time, during the night for example, when no attendant is about to shut the metering valve off, then when the contents of the container such as 26 reaches a predetermined overflow point no further weight will be added to it and the pressure on the hydraulic cylinder 1, and consequently the force exerted by it, will have reached a predetermined maximum and remain constant until the person in charge of the apparatus manipulates the device as a whole to change its operating conditions.

Mercury may be used instead of water which would require a very much smaller container and the container may be applied directly to the rod 17 without the intervention of any lever such as 20, and various other changes may be made without departing from the principle of this invention.

A device of this character is easily calibrated since a drop of water or minim is a definite quantity and the number of drops in a pound of water is well known. Thus a metering valve such as 28 may be readily adjusted to deliver almost an exact quantity of water during a given period of time.

This device is believed far superior to clockwork or electrical devices since cheese factories are frequently located in rural districts where electric service is not available, and it is believed to possess none of the infirmities inherent in clockwork and escapement devices for gradually increasing pressure by even increments over a definite period of time and for halting such increase of pressure when a desired maximum is reached.

As hereinbefore stated it is not the intention to limit this device to the specific structure shown but only to the mechanical equivalent thereof as defined in the following claims.

Having thus described my invention so that those skilled in the art to which it appertains may easily construct, use and receive the benefits thereof, what I claim as new and desire to secure by Letters Patent, is—

1. A regulating arrangement for a hydraulic press comprising a supply of fluid pressure, a reducing valve positioned to control said supply, independent dual control means for said valve comprising an adjustable spring and an independently applied weight, means for gradually increasing the weight by a metered fluid drip and means for fixing a limit to the amount of added weight.

2. In a hydraulic cheese press, a cylinder, a ram operable in said cylinder, a hydraulic pressure supply means for said ram, operative connections between the supply means and the ram, a reducing valve in said connections, adjustable spring means for determining an initial pressure controlled by said reducing valve and means for additionally loading said reducing valve by a metered supply of hydraulic fluid over a period of time.

3. In a cheese press, a hydraulic motor for applying pressure thereto, a hydraulic pressure supply means for said motor, a reducing valve intermediate the supply means and the motor, a container arranged to load said reducing valve and means for delivering a metered supply of fluid load to said container to adjust the reducing valve to deliver a gradually increasing pressure.

4. The combination according to claim 3 and including means to limit the capacity of the container and its ultimate effect on the reducing valve.

5. A dual reducing valve control for a press comprising a spring for initially adjusting the valve, a weight applying container arranged to independently affect the valve and add its influence to that of the spring, metering means to gradually increase the weight of the container by adding fluid thereto and variable means for limiting the ultimate contents of the container.

6. A control for pressure systems comprising a reducing valve for reducing pressure from a fluid pressure source, spring means for initially determining the reduced pressure, a weight system that includes a container independently applied to the reducing valve to add influence of its weight to the influence of the spring to increase delivered pressure and means for gradually increasing the weight by directing a metered supply of fluid into the container.

JOHN L. STEINBACH.